CIRCUIT-ARRANGEMENT FOR USE IN TELEVISION RECEIVERS

Filed Feb. 26, 1952

INVENTOR
Josue Jean Phillippe Valeton
By Fred M Vogel
Agent

Patented Apr. 20, 1954 2,676,254

UNITED STATES PATENT OFFICE 2,676,254

CIRCUIT-ARRANGEMENT FOR USE IN TELEVISION RECEIVERS

Josue Jean Phillippe Valeton, Eindhoven, Netherlands, assignor to Hartford National Bank and Trust Company, Hartford, Conn., as trustee Application February 26, 1952, Serial No. 273,421

Claims priority, application Netherlands March 16, 1951

4 Claims. (Cl. 250—27)

Figure 1:
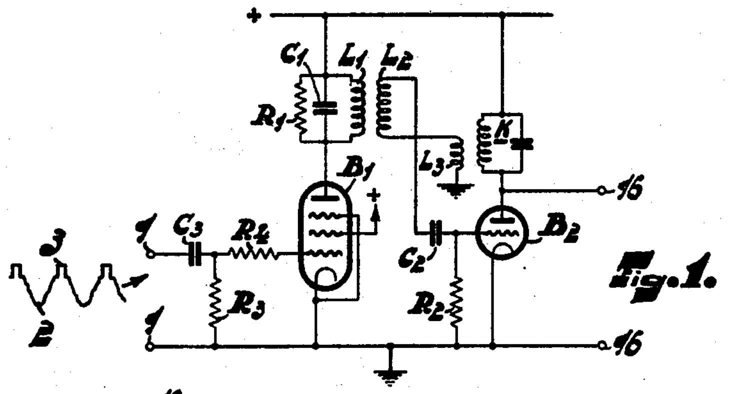

The invention relates to a circuit-arrangement for use in a television receiver adapted to intercept a television signal having an image component and a mixture of line- and frame-synchronizing pulses, in which the frame-synchronizing pulses are interrupted at a rate equal to twice the line-frequency and the mixture of pulses is differentiated after the image signal has been separated.

In the known circuit-arrangements of this kind the differentiated pulse mixture is used directly for synchronizing the sawtooth generators of the receiver.

However, if direct synchronization is not used and an automatic frequency-control circuit in which the frequency and the phase of the deflection oscillations produced are compared with the frequency and the phase of the incoming synchronizing signal is used instead, it may, in certain cases, be desirable to derive a sinusoidal alternating voltage of this frequency from the incoming pulse mixture.

If the fundamental frequency of the line pulses were to be filtered directly from the incoming pulse mixture, a serious interference would be produced periodically due to the periodic frame synchronizing pulses.

Even the aforesaid differentiation of the pulse mixture does not yet provide a solution of this problem, since in this case also voltage interferences are produced due to the frame synchronizing pulses.

The object of the invention is to provide a circuit-arrangement in which these limitations are mitigated.

The circuit-arrangement according to the invention is characterized in that the pulse mixture is supplied with positive polarity to the control-grid of a first discharge tube. The output circuit of this first tube includes a first inductor. The differentiated mixture occurring across this first inductor is supplied through a second inductor coupled with the first inductor, with positive polarity of the pulses produced by differentiation of the front flanks of the line pulses, to the control-grid of a second discharge tube. The output circuit of the second tube includes a resonant circuit tuned to the line frequency, a third inductor coupled with this circuit being included in series with the second inductor in the control grid circuit of the second discharge tube. This second tube is rendered conductive during reception of the mixture of synchronizing pulses only at instants corresponding with the instants of the pulses produced by differentiation of the front flanks of the line pulses.

In the circuit-arrangement according to the invention, the pulse mixture is superimposed on a sine voltage, the desired pulse exceeding a threshold value, at which a discharge tube becomes conductive, unwanted pulses not exceeding this threshold value.

For the sake of completeness it should be noted that such a superimposed pulse mixture is frequently used for selecting particular pulses from a mixture, the sine signal being obtained by exciting a resonant circuit tuned to the fundamental frequency of the desired pulse series by means of the entire pulse mixture, so that the voltage occurring across the resonant circuit is sinusoidal to a sufficient approximation for the desired pulse selection.

However, in such circuit-arrangements the correct sine voltage is obtained only if a second circuit tuned to the fundamental frequency of the desired pulses is excited by means of the pulse series then selected.

Such a complication is avoided in the circuit-arrangement according to the invention.

Figure 2:
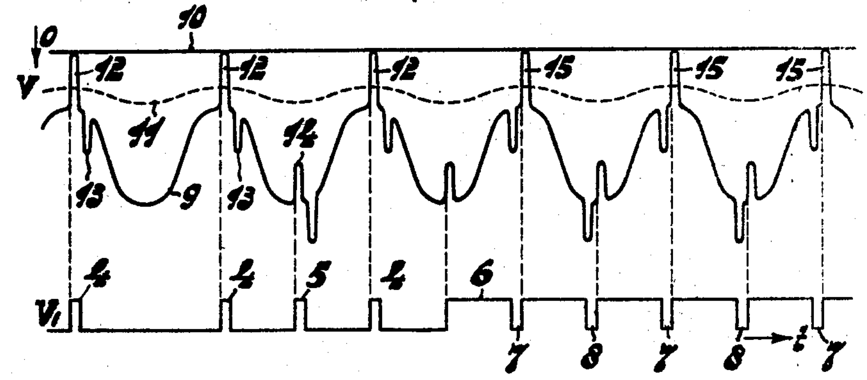
Figure 3:
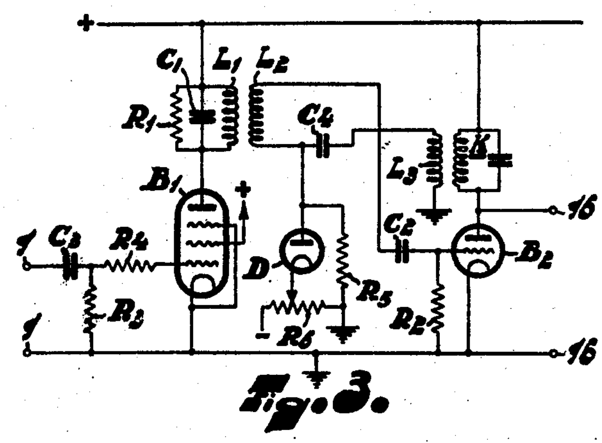

In order that the invention may be more clearly understood and readily carried into effect, it will now be described more fully with reference to the accompanying drawing, in which:

Fig. 1 shows a first embodiment of the circuit-arrangement according to the invention, the operation of which will be explained more fully with reference to the curves of Fig. 2; and Fig. 3 shows a further embodiment of the circuit-arrangement according to the invention.

The circuit-arrangement shown in Fig. 1 comprises two discharge tubes $B_1$ and $B_2$, $B_1$ being a pentode and $B_2$ being a triode.

The anode of the tube $B_1$ is connected to an inductor $L_1$. Capacitor $C_1$ is connected in parallel with the inductor and with a damping resistor $R_1$.

The inductor $L_1$ is coupled with a second inductor $L_2$, of which one end is connected through the capacitor $C_2$ to the control-grid of the tube $B_2$. The control-grid is connected through a grid lead resistor $R_2$ to the cathode of the tube.

The other end of the second inductor $L_2$ is grounded through a third inductor $L_3$.

The inductor $L_3$ is inductively coupled with the resonant circuit K included in the anode circuit of the tube $B_2$.

The control-grid circuit of the tube $B_1$ includes a grid capacitor $C_3$, a grid leak resistor $R_3$ and a grid series resistor $R_4$.

A television signal consisting of the negative image signal 2 and the positive synchronizing pulses 3 is supplied to the input terminal 1.

The image signal is separated by peak detection in known manner from the synchronizing signal, so that only the synchronizing signals are supplied to the control-grid of tube $B_1$ as the control-voltage, which renders the tube conductive each time.

At $V_1$ in Fig. 2 the course of the synchronizing signal is shown as a function of time.

This signal comprises line pulses 4, a number of equalization pulses 5, of which only one is shown, and a frame pulse 6, which is interrupted by pulses 7 and 8 at a rate equal to twice the line frequency.

The leading edges of the line pulses correspond with the trailing edges of the interrupting pulses 7.

When a positive pulse 4, 5 or 6 is produced at the control-grid of tube $B_1$, the latter becomes conductive, so that a voltage is produced across the inductor $L_1$, corresponding with the differentiated voltage.

This differentiated voltage, which is supplied to the control-grid of tube $B_2$, includes both the desired line pulses and the undesired frame pulses.

If only the desired pulses are operative at this control-grid, which is the case in the equilibrium condition, as will be seen hereinafter, these pulses render the tube $B_2$ conductive and the tuned circuit K in the anode circuit (tuned to line frequency) is excited and a sine voltage is produced thereacross.

The sine voltage is also produced across the inductor $L_3$ and is supplied in series with the voltage across the inductor $L_2$ to the control grid of tube $B_2$.

The amplitudes of the voltages across inductors $L_2$ and $L_3$ and the control-grid voltage of tube $B_2$ are now so chosen that in the presence of synchronizing signals this tube is controlled only by the desired pulses and not by the undesired pulses or the sine voltage.

In the circuit-arrangement shown in Fig. 1 the negative bias voltage of the control-grid of tube $B_2$ is automatically produced by peak detection with the use of the grid capacitor $C_2$ and the grid leak resistor $R_2$.

In Fig. 2 the full curve 9 indicates the superposition of the differentiated pulse mixture on the sine voltage, this voltage being shown with respect to the horizontal line 10, which corresponds to the voltage at which control-grid current begins to flow, so that it virtually represents the cathode potential, i. e. zero voltage.

The slightly undulating broken line 11 indicates the cut-off potential of tube $B_2$; since the tube is a triode, this potential varies slightly as a function of the effective anode voltage.

Considering, for example, the line pulses 4, it is found that, upon differentiation, the leading edge produces a voltage pulse 12 in a positive sense and the trailing edge produces a voltage pulse 13 in a negative sense.

This also occurs with the equalization pulse 5 which falls between two line pulses, but the positive voltage pulse 14 then produced is superimposed on the minimum value of the sine voltage.

This also applies to the leading edge of the frame pulse 6 and to the trailing edge of the interrupting pulses 8, whereas on the other hand, the voltage pulse 15 produced by the differentiation of the rear flank of the interrupting pulse 7, is superimposed on the maximum value of the sine voltage.

In order that the tube may be controlled by the pulses 12 and the corresponding pulses 15 only, the amplitude of these pulses must exceed the grid space of the tube $B_2$, i. e. exceed the voltage corresponding to the maximum space between the straight line 10 and the curve 11 of Fig. 2.

In addition, the voltage value equal to twice the maximum amplitude of the sine voltage must exceed the voltage pulses occurring upon differentiation, since otherwise the peak of the pulse 14 could rise above the line 11 and tube $B_2$ would conduct current at an undesired time.

Consequently, when the circuit-arrangement has been correctly adjusted, a sine voltage of line frequency is taken from the output terminals 16 and no irregularities due to frame pulses are present.

Since peak detection occurs at the control-grid of tube $B_2$ in the circuit-arrangement shown in Fig. 1, so that the exact peaks of the signal operative at the control-grid produce grid current, in the absence of the synchronizing pulses, the peaks of the fed-back sine signal shift towards the grid space of the tube, until they produce grid current.

In this case the circuit-arrangement operates as an oscillator and a sine voltage may be taken from the output terminals 16 of the arrangement. This sine voltage is not synchronized, which is very useful for various cases.

In the circuit-arrangement shown in Fig. 3 oscillations are not produced when the synchronizing pulses are absent.

In this circuit-arrangement in which the components corresponding with components shown in Fig. 1 are designated by the same reference numerals, the positions of the sine signal peaks are so limited that they cannot shift towards the grid space of the tube $B_2$.

For this purpose a capacitor $C_4$ is connected between the inductors $L_2$ and $L_3$.

The end of capacitor $C_4$ remote from the inductor $L_3$ is grounded through a resistor $R_5$. The series connection of a diode B and a portion of a potentiometer resistor $R_6$, is in parallel with this resistor. One end of the potentiometer is connected to a source of negative bias.

With the use of such a circuit-arrangement known per se and if the time constant $C_4$, $R_5$ is chosen to be sufficiently high with respect to the frequency of the alternating voltage across the inductor $L_3$, the peak value of this alternating voltage is fixed at the level which is determined by the negative voltage operating in series with the diode D.

This voltage is chosen to be such that the exact peak value of the sine voltage remains below the cut-off point of tube $B_2$ indicated in Fig. 2 by the broken line 11.

Consequently, as long as synchronizing signals are received, the tube $B_2$ is controlled by the pulses 12 and 15.

If the synchronizing signal is not received, the tube $B_2$ remains cut-off.

What I claim is:

1. In a television receiver for intercepting an incoming television signal having an image component and a pulse mixture component and wherein said components are separated, said mixture component containing line synchronizing pulses which are generated at line frequency and frame synchronizing pulses which are interrupted at a rate equal to twice said line frequency, apparatus for deriving from said line pulses an alternating voltage of said line frequency comprising first and second electron discharge tubes, each having a control electrode and an output electrode, an output circuit coupled to the output electrode of said first tube and including a differentiating network constituted by a first inductance, an output circuit coupled to the output electrode of said second tube and including a resonant network tuned to said line frequency, said resonant network yielding said alternating voltage, means to supply said mixture component with positive polarity to the control electrode of said first tube wherein a differentiated mixture component is produced across said first inductance, means including a second inductance inductively coupled to said first inductance and a third inductance in series with said second inductance and coupled to said resonant network to combine said differentiated component with said alternating voltage to produce a summation voltage wherein the pulses obtained by differentiation of the leading edges of said line pulses have positive polarity, and means to supply said summation voltage to the control electrode of said second tube to render said second tube conductive at instants when said positive polarity pulses are present in said summation voltage whereby said alternating voltage is substantially unaffected by said frame synchronizing pulses.

2. Apparatus for use in a television receiver as set forth in claim 1 wherein said third inductance is inductively coupled to said resonant network.

3. Apparatus for use in a television receiver as set forth in claim 1 wherein said means to supply said summation voltage includes a peak detector.

4. Apparatus for use in a television receiver as set forth in claim 1 further including a capacitance interposed in series connection between said second and third inductances, the end of said third inductance remote from said capacitance being connected to a first point of constant potential, and two parallel circuits coupled between a second point of constant potential and the end of said second inductance adjacent to said capacitance, one of said circuits including a resistance, the other of said circuits including a diode.

References Cited in the file of this patent

UNITED STATES PATENTS

| Number | Name | Date |
|---|---|---|
| 2,277,000 | Bingley | Mar. 17, 1942 |